April 21, 1964  R. BORNAND  3,130,106
APPARATUS FOR MAKING COMPOSITE MOSAIC
Filed Feb. 17, 1959  5 Sheets-Sheet 3
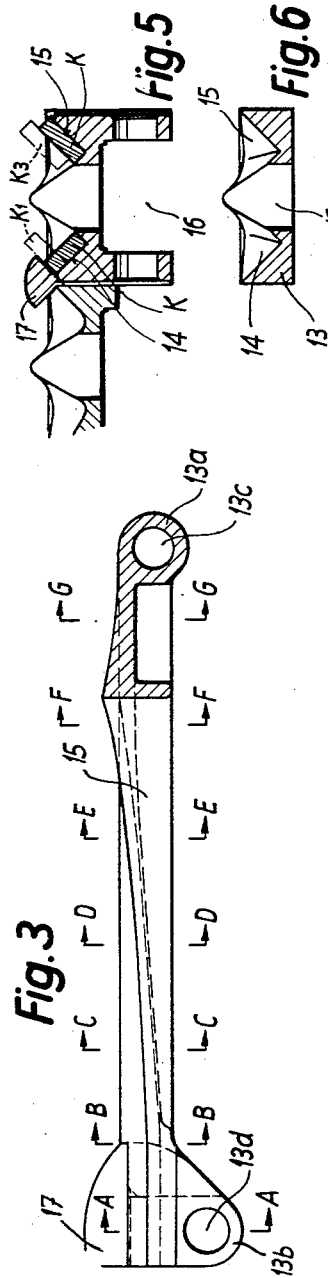

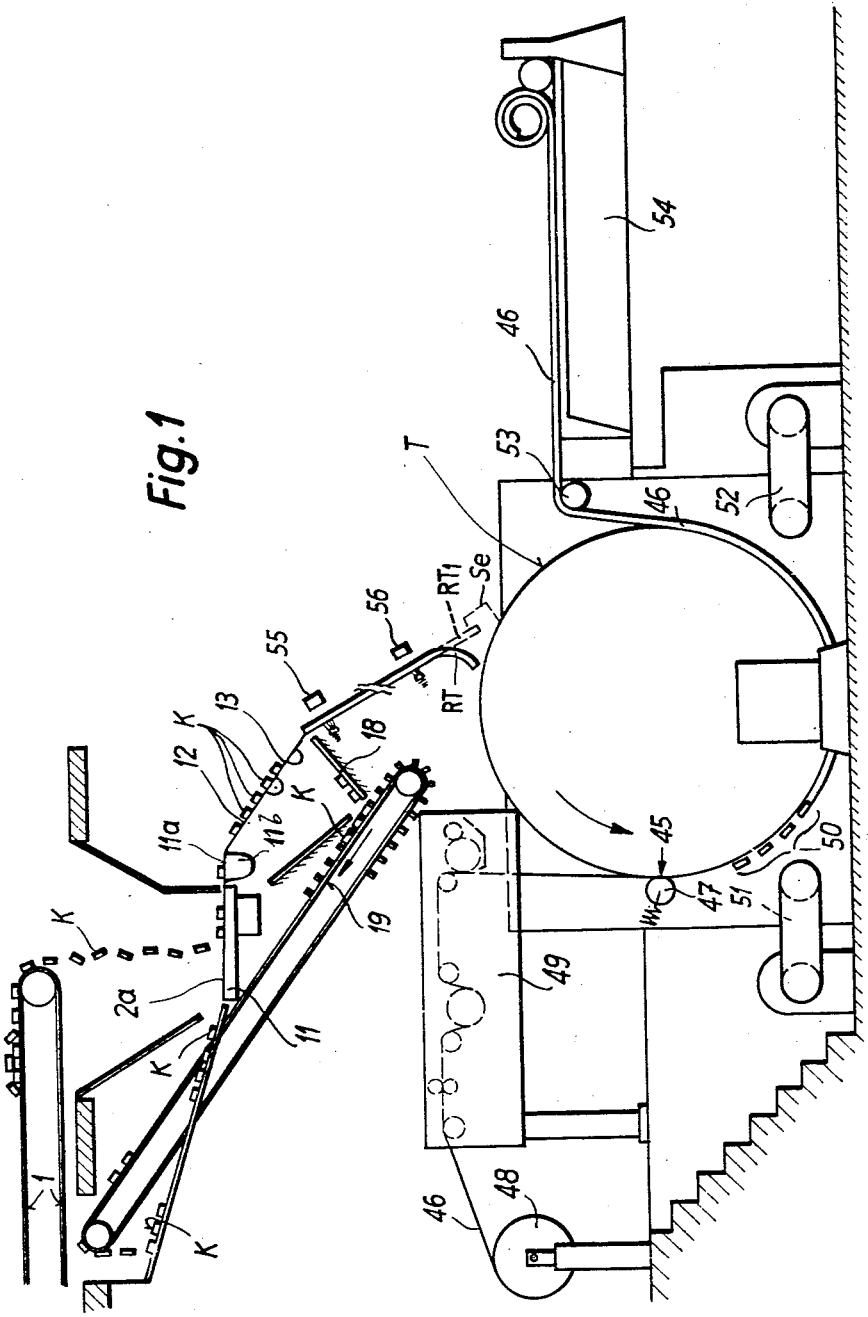

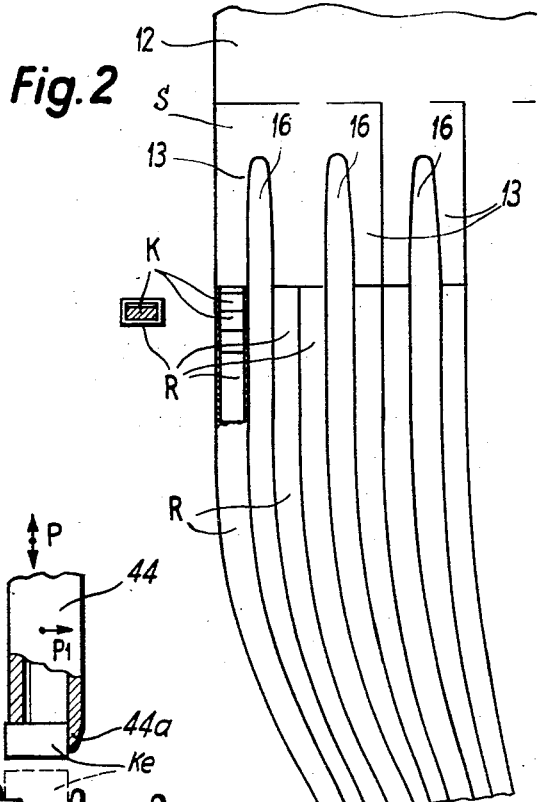
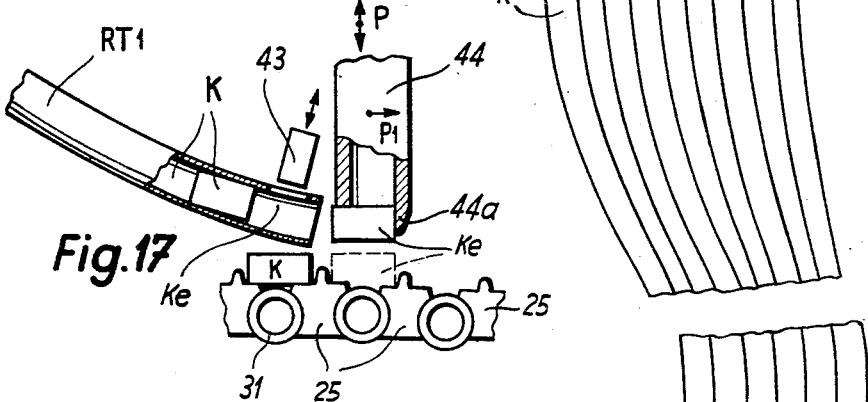
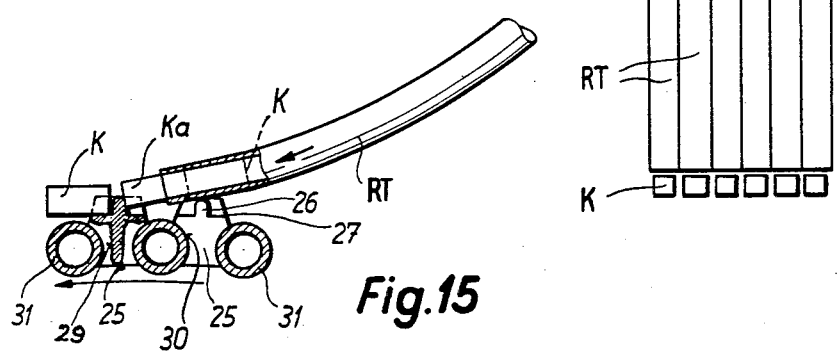

Inventor
Rene Bornand
By Watson, Cole, Grindle + Watson
Attys.

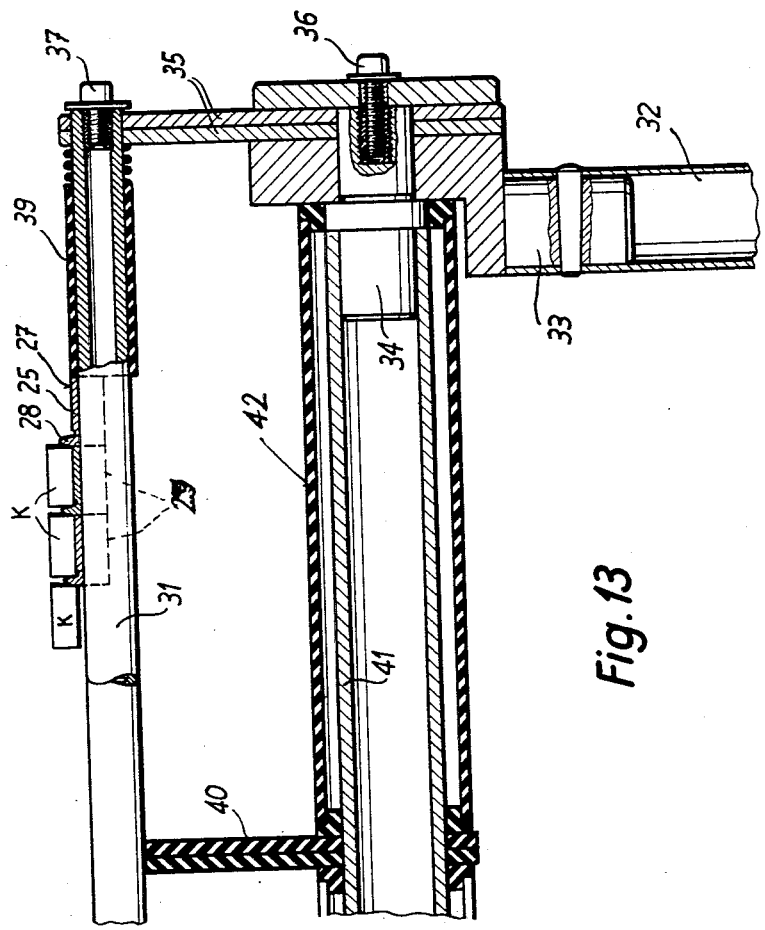

United States Patent Office 3,130,106
Patented Apr. 21, 1964

3,130,106
APPARATUS FOR MAKING COMPOSITE MOSAIC
René Bornand, Zurich, Switzerland, assignor to
Rolltex AG., Zurich, Switzerland
Filed Feb. 17, 1959, Ser. No. 793,717
Claims priority, application Switzerland Feb. 18, 1958
2 Claims. (Cl. 156—552)

This invention relates to an arrangement for making composite mosaics, in particular wooden mosaics.

Arrangements are known of the type, in which the small pieces, intended for fashioning the mosaic layer, are guided over a plurality of juxtaposed inclined channels, orderly arranged, then continuously pressed against a band-like carrier, the composite mosaic thus made passed through a dryer, and then carried off for further use.

The object of the present invention is to improve the prior art and arrangements of the kind referred to, especially in view of an absolutely reliable and regular sorting and orderly arranging of the small pieces (for brevity hereinafter referred to as cubes), the faultless introduction into the feed channels and regular setting of the cubes onto the backing, together with which the cubes constitute the composite mosaic.

Accordingly, the method as per invention principally consists in that the cubes on a heap of unsorted ware elements are positively guided to, into, through and out of the channels, by which each cube upon leaving the channel, is each time properly laid into a field suited to the size of the cube in the superficies of a rotating drum, and that the band-shaped carrier moved at the same speed as the drum is guided over the cubes set into the fields and pressed against them with the adhesive side, whereby the composite mosaic, after passing through the dryer, is carried away from the drum for further use.

The arrangement mainly comprises a plurality of juxtaposed, inclined channels of such design that the cubes form a loose heap of unsorted elements are positively guided to, into, through and out the channels; a drum having fields on its superficies corresponding to the cube size, into which fields the cubes are positively and properly laid; an apparatus for delivering and pressing the band-shaped carrier with its adhesive face against the cubes in the fields of the drum, as well as a dryer which extends at least over a portion of the periphery of the drum.

Further features of the invention will appear from the following description and claims, taken in conjunction with the accompanying drawing which shows, purely by way of example, one form of embodiment of the arrangement.

In said drawing:

FIG. 1 is an end view showing diagrammatically the main part of the arrangement;

FIG. 2 shows a top view of the channel part of the arrangement according to FIG. 1;

FIGS. 3 and 4 show respectively in part-sectional side view and in top view the sorting apparatus of the guide-channel system;

FIGS. 5–11 are sectional views of the sorting apparatus according to FIGS. 3 and 4;

FIG. 13 is a fragmentary view of the drum in axial section;

FIG. 15 shows in detail the part of the arrangement in which the cubes leave the channel and lay themselves into the fields of the drum;

FIG. 17 represents a modified form of the portion of the arrangement serving for inserting the cubes into the holding pieces on the drum;

Figure 12:
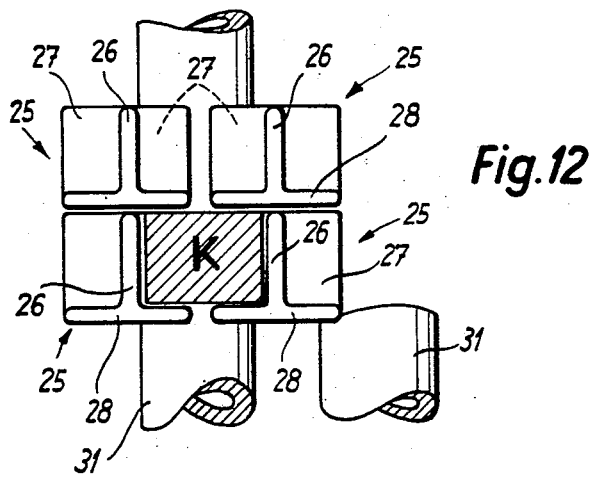
FIG. 12 is a top view of a section of the drum.

The cubes which, according to the embodiment of the installations described hereinafter, are for instance sized 25 x 25 x 9 mm., are manufactured in known manner somewhat as follows before they reach the actual unit forming the object of invention.

The rough moldings are fed from a pre-sorting machine, whereupon a planing apparatus attends to the planing of the rough blanks. Thereupon the cut lamellae are sewn substantially to quadratic elements K which are conveyed upwards through a lifting device onto a conveyor belt 1 above the actual installation, and thence into the silo 2 thereof. In the same installation different silos may be provided for different types of wood. Located below the lower opening 2a of the silo 2 is a vibrator 11 onto which the cubes K will fall (FIG. 1). Numeral 11a designates a shaking sieve, through which dust, small waste and the like can drop into a collector 11b. Adjacent the shaking sieve 11a there is an inclined slide-plate 12 which, over its whole width, forms a single surface which is closed at the edge and provides for further distribution of the quantity of cubes put on. The slide-plate 12 serves as a collection field for the loose and unplaned elements and as a first section of the guide-channel system through which the cubes are fed beside each other and after each other to the empty holding pieces of a drum. Following said slide-plate is a sorting apparatus (FIGURES 1 and 3 to 11) through which the cubes K are brought in rows consecutively (to the) the proper position of readiness for further orderly delivery.

The sorting apparatus is shown in detail in FIGS. 3–11. It consists of a plurality of guide pieces 13 of aluminum casting, arranged in juxtaposition. Each of said pieces comprises two rails 14, 15 which are bifurcated and leave an empty space 16 therebetween. The ends 13a, 13b of the guide pieces possess eyelets 13c, 13d for stationary arrangement and for connecting them to the slide plate 12 on the one hand, and on the other hand to the channels R leading to the drum. The guide pieces 13 held assembled by a fixing bolt passing through the eyelets 13c, 13d are connected with the ends 13a to the slide-plate 12, and with the ends 13b to the channels R.

In their course from top 13a to bottom 13b, the rails 14, 15 are given quite a peculiar design, as apparent from the various cross-sections thereof according to FIGS. 5–11. FIG. 5 shows the conditions, when the cubes K from the slide-plate, still unassorted, reach the sorting apparatus and come onto the rails 14, 15. Of the various cubes K, $K_1$, $K_2$ and $K_3$ which, for instance, have reached the rails 14, 15 in the position shown, only the cubes K lie properly in the rails 14, 15. The cubes $K_1$, $K_2$, $K_3$ must either come into the proper position like the cubes K or else be thrown off and be brought back again. If the cubes $K_1$, $K_2$ and $K_3$, when sliding, do not adjust themselves into the proper position, they will either fall into the space 16 or be deviated by a stripper 17 at the lower end 13b of the guide-piece and thus fall into the space 16. By the disclosed means, a positive sorting out and proper guidance of the cubes is ensured so as to enable all of them, at the end of the sorting apparatus, successively to enter in the same position the other channels R which are also inclined.

The superfluous cubes K, or those fallen into the empty spaces, are collected by a tray 18, whence they slide on a conveyer belt 19, are then carried upwards and return by means of a chute 20 via silo floor or vibrator 20 to the collecting field 12 and thence to the sorting apparatus.

Whereas the sorting apparatus is given a length of, say, about 430 mm., the subsequent channels R are 1500 mm. long. These channels R are each connected to a rail 14 or 15 of the sorting apparatus. The channels R are closed (FIG. 2), and the cubes which entered them in consecutive order in the proper geometric position are guided in direction to the holding pieces of the drum. Said channels R which at the top are spaced apart by the distance of the rails 14, 15 of the sorting apparatus, are led together in their further course, as seen from FIG. 2, in accordance with the fields lying beside each other or with the holding pieces on the superficies of the drum.

Figure 14:
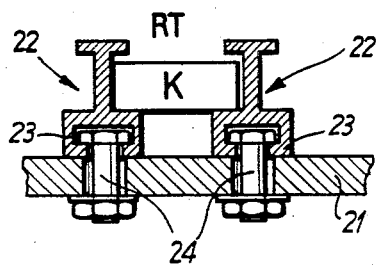
FIG. 14 is a cross-section of the portion of the channel system towards the outlet of the cubes.
Figure 16:
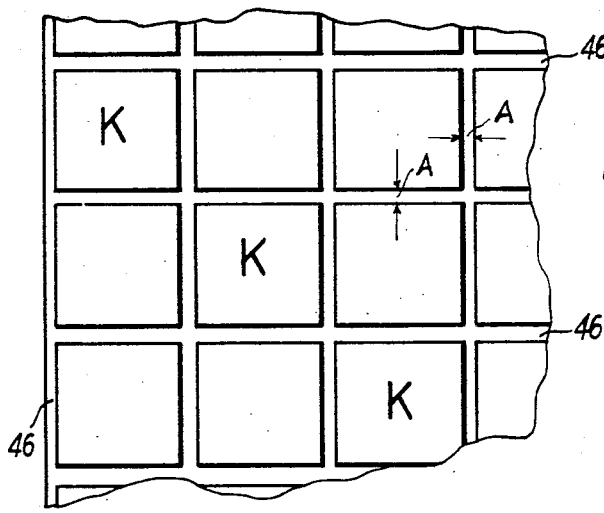
FIG. 16 shows a fragmentary top view of the completed composite mosaic.

The closed channels R are followed by other channels RT adapted to lead the cubes to their outlet. In proportion to the lengths of the channels S and R of the above example, the channels are about 3000 mm. long. These channels are shown in greater detail in FIG. 14; they consist of rails spaced apart and fixed on a base 21, of which the upper H-sections 22 of two neighboring rails carry between them one cube or a row of cubes, whilst the lower sections 23 serve for detachably and adjustably fastening the rails on their base by means of screw-bolts 24. Whilst the channels R are stationary, the channels RT are laterally adjustable with respect to their base 21, in order to permit of adjusting their distance apart and thus the distance apart of the cubes with regard to their definite lateral spacing A on the drum or carrier path (FIG. 16).

As apparent from FIGS. 1 and 15, the channels RT are bent back (cf. especially FIG. 15) in relation to the inclined run of the slide-plate 12, sorting apparatus 13 and channels R; their run-out includes an acute angle with the superficies of the drum. The drum T is continuously driven in such a sense of rotation as to cause the holding pieces thereon to move in the same direction as the cubes K issuing from the channels RT.

From the foregoing explanations concerning the various channel system it will be realized that the cubes, upon entering the sorting apparatus, are imparted a positively directed guiding up to their outlet from the channels, each cube being driven forward by the pressure of the weight of the following cubes.

The empty fields or holding pieces, into which the cubes are laid upon leaving the channels RT, are on the superficies of the drum T (FIGS. 1, 2, 12, 13). The cube fields are spaced apart by ribs both in the peripheral direction of the drum T and transversely thereto. The thickness of the ribs corresponds to the distance A which the elements take up in the finished composite mosaic (FIG. 16). The fields are formed by holding pieces 25 firmly arranged in juxtaposition and one after the other each of which has only one longitudinal rib 26 with bearing faces 27 at both sides, and a transverse rib 28 at one end. As shown in FIG. 12, for receiving a cube K, a closed field is thus constituted by four holding pieces 25 arranged on the superficies of the drum, namely two beside each other, and two behind each other.

The holding pieces 25 include a portion 29 extending radially to the drum T, through which they are fastened to the drum in the described way with reference to FIG. 13. The portion 29 of each holding piece 25 running radially to the drum T has two identical but oppositely arranged concave recesses 30 (FIG. 15), with each of which it is held by a round stay 31. The stays 31 are arranged on the periphery of the drum and axis-parallel thereto at a distance such that each time between two neighboring stays 31 alongside thereof, a row of holding pieces 25 are pushed on one behind the other and fixed. In this way, also in the peripheral direction of the drum T, there are provided adjacent holding pieces so that the drum surface comprises a closed total field of holdings pieces 25 arranged beside or behind each other.

The cubes (or elements) are inserted into the holding pieces as follows:

The elements, conveyed continuously one behind another and positively guided towards the slowly rotating drum T, issue from the channels RT so that they engage one after another in successively positioned holding pieces 25. Thus for instance, the cube K just emerging from a channel RT strikes against the longitudinal ribs 26 of two neighboring holding pieces 25 (FIGS. 12 and 15). On continued rotation of the drum T and further conveyance of the cube K, this lays itself into the field (FIG. 12) where it will be retained by the surrounding longitudinal and transverse ribs of the four holding pieces. Each field is formed only by a portion of the four holding pieces, the other portions (transverse and longitudinal ribs and bearing faces 27) serving to form neighboring fields.

The aforementioned stays 31 are mounted on the periphery of the drum T in the way as described hereinafter (FIG. 13). Numeral 32 designates a spoke of the drum T, which has pinned therein a block 33 having in turn attached thereto by means of a screw, a guide-bolt 34 and two contiguous aluminium plate segments 35. Said segments carry at the top the tubular stays 31 mounted thereon by means of screws 37. As mentioned hereinbefore, the holding pieces are pushed on behind each other between each two neighboring stays in the longitudinal direction thereof. A sleeve 39 on the stay 31, biased by a spring 38, keeps the holding pieces 25 in place. Throughout their length or the length of the drum, the stays are supported by segments 40 which are mounted on an aluminium sleeve 41. The sleeves 41 are surrounded by sleeves 42 of insulating material. Also the segments 40 consists of insulating material, as do the holding pieces 25. This is done so because a portion of the drum periphery is surmounted by a high-frequency dryer, which the completed composite mosaic is carried past.

FIG. 17 shows a modified form of the construction for laying the cubes into the fields formed by the holding pieces 25. This is a special setting device. In this embodiment, the drum is driven step by step; the drum is then turned a little, stopped and again turned, and so on. The channels RT, from which the cubes K emerge, are not bent back in the direction of the movement of the cubes in the sense of the aforedescribed example, but have—as channels $RT_1$—substantially the same inclined run as the channels R (cf. channels $RT_1$ shown in broken lines in FIG. 1). The channels $RT_1$ are thus given a run-out which is directed contrary to the sense of rotation of the drum T.

Arranged at the end of the channels $RT_1$ is a setting device Se (FIGS. 1 and 17), by which the cubes K are gripped one after another upon issuing from the channels $RT_1$, brought over the pertinent fields of the drum and then laid thereto at each stop of the drum. The setting device includes a stamp 43 allocated one to each channel $RT_1$, which are arranged at the end of the channels in superposed relation and adapted to act upon the cubes through an aperture. Furthermore, each channel $RT_1$ has at its outlet a suction member 44 which is capable of moving upwards and downwards in the direction of the drum, as well as somewhat sideways in the peripheral direction thereof (arrows P and $P_1$ in FIG. 17). The stamp 43 as well as the suction members are so adjusted in relation to each other that the cube (Ke) will be checked by the stamp at the end of the channel, by its being pressed against the opposite wall of the channel. When released by the stamp 43, it will be thrown, by the pressure of the following cube, out of the channel against an abutment 44a on the suction member 44. But simultaneously it will be attracted by suction, whereupon the suction member rises and is laterally controlled in such a way that the gripped cube Ke lies exactly over the field intended for it. The suction member then goes down and passes the cube under release into the field.

In order to increase production, per row also two or more suction members may be arranged one behind the other in the peripheral direction of the drum.

The cubes, laid into the fields and filling the whole area, then travel a certain distance with the drum to a place 45 (FIG. 1), where the carrier band 46 of jute or the like is applied. At this location there is a spring-loaded pressure roller 47 which presses the band 36 applied to the elements (or cubes) on the drum. The band 46 is taken from a stock roll 48 in a manner known per se and passes through a device 49 for the continuous uniform application of a binder or adhesive to the band 46 on the side facing the drum. It is important that the band 46 be pressed, in a stretched or tightened condition in transverse or longitudinal directions, against the elements on the drum. The tightening may, for instance, take place in the device 49, immediately before applying the adhesive. The drum and the band 46 travel together over a portion of the peripheral path, whereby, along the peripheral section 50, drying will take place, through which the adhesive will dry by removal of water, and thus firm adhesion of the cubes on the band will be achieved. Drying is preferably done by high-frequency heating. The water vapour thereby produced will be drawn off by a device 51. After the heating, cubes and band are cooled in an air cooler 52. At location 53, the now completed composite mosaic will emerge as a roller mat and be carried on a table to be cut there to length. The table 54 serves to cut in a simple manner the delivered lengths by means of scissors or knives to the required size. At the same time the table incorporates a device adapted to automatically and continually reduce the jute by the amount projecting at the sides—the band of standard and commercial size having been chosen wider than the corresponding width over the elements—thus bringing the edges exactly to the width of the cubes.

It has still to be mentioned that the beginnings of the channels R and the ends of the channels RT have allocated thereto photo-electric cells 55 and 56 respectively per channel, through which the filling of the channels with cubes can be supervised. Thereby the arrangement is such that the photo-cells 55 at the beginning of the channels R, if these are not completely filled, will respond by an optical signal and thus cause a reduction of the speed of the machine drive, while the photo-cells at the outlet of the channels RT also respond to incomplete filling and cause stoppage of the machine or drum. If, consequently, the channels R are not filled one after another with cubes, the rotary speed of the drum will be reduced, in order that, if necessary, the channels may be refilled by hand. Should for any reason the final channels RT be not filled in an orderly manner, the drive of the machine will be stopped by the photo-cells, in order that defects can be determined and that in no case the fields are incorrectly filled with cubes.

It is undersood that various changes and modifications may be made in the embodiments illustrated and described herein without departing from the scope of the invention as defined in the following claims.

What I claim is:

1. In an installation for making mosaics, in particular wooden mosaics, a conveying device to feed small cubes to and into the fields of a drum comprising a plurality of juxtaposed and inclined channels adapted to guide the small cubes from a loose heap of unassorted cubes onto, through, and out of said channels, the juxtaposed and inclined channels for guiding the small cubes being subdivided in the direction of conveyance into a plurality of sections with the first section serving as a wide collection field for the loose unassorted pieces with the next section serving as an actual sorting apparatus and the last section as a closed guide for the proper geometric outlet and inlay of the cubes delivered in rows behind each other into the empty fields of the drum, the sorting apparatus being formed by juxtaposed and inclined rails having special faces for properly positioning the cubes, and strippers for any improperly positioned cubes, said rails constituting empty spaces adjacent each other at a distance apart and through which the separated cubes will fall on a chute directing them back to the conveyer.

2. In an installation for making mosaics, in particular wooden mosaics, a conveying device to feed small cubes to and into the fields of a drum comprising a plurality of juxtaposed and inclined channels adapted to guide the small cubes from a loose heap of unassorted cubes onto, through, and out of said channels, the juxtaposed and inclined channels for guiding the small cubes being subdivided in the direction of conveyance into a plurality of sections with the first section serving as a wide collection field for the loose unassorted pieces with the next section serving as an actual sorting apparatus and the last section as a closed guide for the proper geometric outlet, the channels leading to the drum consisting of laterally spaced rails mounted on a base, of which upper H-sections of two adjacent rails each carry therebetween one row of cubes, and the lower sections being adapted for detachably and adjustably fastening the sections on the base.

References Cited in the file of this patent

UNITED STATES PATENTS

| | | |
|---|---|---|
| 691,261 | Graham | Jan. 14, 1902 |
| 832,207 | Pierce | Oct. 2, 1906 |
| 1,315,167 | Semashko | Sept. 2, 1919 |
| 1,369,377 | Benson | Feb. 22, 1921 |
| 1,447,155 | Semashko | Feb. 27, 1923 |
| 1,828,013 | Yingling | Oct. 20, 1931 |
| 1,939,157 | Yingling | Dec. 12, 1933 |
| 2,377,409 | Edelman | June 5, 1945 |